United States Patent [19]

Miyazaki et al.

[11] Patent Number: 4,899,030

[45] Date of Patent: Feb. 6, 1990

[54] HIGH-POWER-DENSITY BEAM WELDING METHOD IN COMBINATION WITH UPSET WELDING AND APPARATUS THEREFOR

[75] Inventors: Yasunobu Miyazaki; Tohru Saito; Taizo Nakamura, all of Kanagawa, Japan

[73] Assignee: Nippon Steel Corporation, Tokyo, Japan

[21] Appl. No.: 240,612

[22] Filed: Sep. 6, 1988

[30] Foreign Application Priority Data

Sep. 4, 1987 [JP] Japan ................................ 62-221562
Aug. 8, 1988 [JP] Japan ................................ 63-197697

[51] Int. Cl.$^4$ ............................................ B23K 26/00
[52] U.S. Cl. ............................ 219/121.63; 219/121.64; 219/121.13; 219/121.84
[58] Field of Search .................... 219/121.63, 121.64, 219/121.13, 121.14, 121.84

[56] References Cited

U.S. PATENT DOCUMENTS 4,649,256  3/1987  Minamida et al. ......... 219/121.62 X

FOREIGN PATENT DOCUMENTS 57-160582 10/1982 Japan.
58-100982  6/1983 Japan.

OTHER PUBLICATIONS

K. Minamida et al., "Wedge Shape Welding, etc.", Proceedings of the 5th International Congress on Applications of Lasers and Electro—Optics, ICALEO '86, Nov. 10-13, 1986.

Primary Examiner—C. L. Albritton
Attorney, Agent, or Firm—Wenderoth, Lind & Ponack

[57] ABSTRACT

Method and apparatus for high-power-density beam welding in combination with upset welding. The method comprises forming, along abutting edges of metal materials to be welded, a continuous upset weld line, and subsequently beam welding the metal materials by irradiation by a high-power-density beam along the weld line. The output of the high-power-density beam is determined on the basis of an input heat produced by resistance heating in the metal materials during the upset welding, as well as a welding pressure given to the metal materials during the upset welding.

14 Claims, 3 Drawing Sheets

HIGH-POWER-DENSITY BEAM WELDING METHOD IN COMBINATION WITH UPSET WELDING AND APPARATUS THEREFOR

BACKGROUND OF THE INVENTION

1. Field of the Invention

The present invention relates to a method of high-power-density beam welding in combination with upset welding for metal plates, sheets and wires, or formed or machined articles made therefrom, and an apparatus for performing the method.

2. Description of the Related Art

Conventionally, upset resistance welding methods such as upset welding and flash welding, or high-power-density beam welding methods using laser, electron beam, etc. have often been used to join metal plates, sheets and wires, especially those of relatively small thickness or diameter.

The upset welding method comprises clamping two parts to be welded to each other on a fixed electrode and a movable electrode, respectively, advancing the movable electrode toward the fixed electrode to upset the abutting edges of the parts against each other, and supplying an electric current to the parts while causing a predetermined upsetting pressure on the abutting edges thereof. The heat produced within the parts by the resistances of the parts and the contact resistances of the abutting faces thereof will produce plastic deformations in the parts and weld the parts to each other.

The flash welding method is performed using the same welding steps and with the same arrangement as in the above-described upset welding method, except that flashes are produced between the parts during the welding process to assure heating with higher efficiency.

These resistance welding methods present great merits in economy such as elimination of filler metal, a high efficiency due to a short welding time, and do not require high accuracy in the machining of the abutting edges of the parts to be joined.

In addition, these methods present the advantage that the entire area of the abutting surface of the parts are joined to each other simultaneously, so that distortions due to the temperature gradient of the weld are smaller than those caused by arc or beam welding, where the edges of the parts are welded to each other along the weld line sequentially by moving from one extremity thereof to the other.

For comparison between flash welding and upset welding, the former is feasible even if the edge machining is relatively rough, while the latter is more suited for automation of a welding line which requires a clean working environment, because it produces no flash during the welding process.

Upset welding methods are described, for example, in the Japanese Laid-Open Patent Applications No. Sho 61-38787 and No. Sho 61-38788.

The high-power-density beam welding method comprises directing a laser beam or high-power-density electron beam onto abutting edges of parts to be joined to fuse and weld the abutting edges. This welding method has been widely practiced, because it presents great technical and economical merits. The use of a concentrated heat source with a high energy density results in narrower heated and fused areas of the parts members and narrower areas of the parts in which the material properties are chanced and geometrical deformation is caused Despite the above advantages, the upset welding methods present the follwing disadvantages:

(1) They require a large amount of electric power for heating and a high mechanical force for welding pressure;

(2) Excess metal formed at the interface of the abutting edges must be trimmed after welding. This trimming requires an additional step and results in increased losses of welded products causing a lowered yield;

(3) Defects such as oxide slag, insufficient heat and defects due to the upsetting pressure are liable to be left in joined interfaces, especially in the welded edge portion of the parts. Since there is no applicable non-destructive inspection method for these defects, the consistency of product quality must be assured by relying on a random sampling with destructive inspection. Therefore, the quality guarantee control cost is increased, especially for products which require high reliability.

The high-power-density beam welding method presents the following disadvantages;

(1) The use of concentrated heat source requires a high accuracy in work piece alignment and consequently a large amount of labor for edge preparation. To solve these problems, a method wherein a preliminary welding is performed before the main welding is irradiation of high-power-density beam is disclosed in the Japanese Laid-Open Patent Application No. Sho 57-160582.

(2) The quick heating and quick cooling of welded objects leads to excessive hardening and undesirable changes in material properties.

(3) Any shortage of filler metal tends to produce defects in weld bead formation, such as lack of weld metal produced at the edge portions of a welded parts at the finishing points of welding, as well as undercuts and collapses in weld sections, which cannot be repaired after the completion of welding, or may adversely affect the mechanical strength of welded objects.

The Japanese Laid-Open Patent Application No. Sho 57-202985discloses an electric welding method wherein an electric contact is effected by laser irradiation first and then resistance Joule heating is caused by electric conduction. This method is intended to weld two materials which are remarkably different in their heat capacity.

SUMMARY OF THE INVENTION

An object of the present invention is not merely to combine the above-described upset and beam welding methods for the purpose of offsetting the disadvantages of the two methods with each other, or to compensate for the disadvantages of one method with the advantages of the other, but to provide a truly new welding method.

Another object of the present invention is to provide a high-power-density beam welding method in combination with upset welding, which comprises forming, along abutting edges of metal parts to be welded, a continuous weld upset line, and subsequently beam welding the metal materials by irradiation by a high-power-density beam along the weld line. The output of the high-power-density beam is determined on the basis of an input heat produced by Joule heating in the metal materials during the upset welding as well as a welding pressure given to the metal materials, with the metal materials being heated by supplying an electric current thereto before, during and/or after the irradiation by the high-power-density beam.

DETAILED DESCRIPTION OF THE INVENTION

Figure 1:
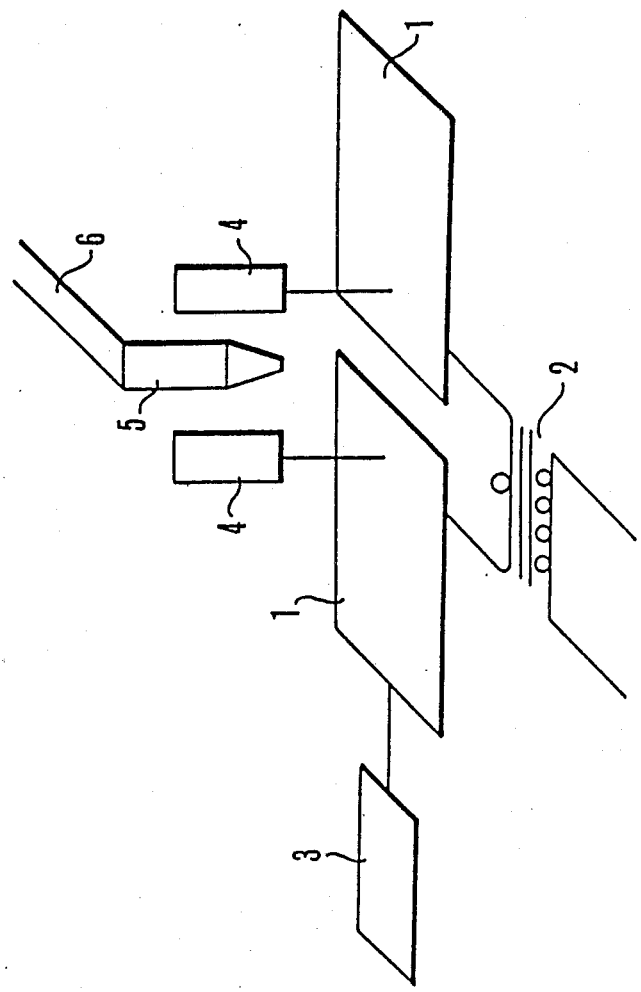
FIG. 1 is a perspective view showing an embodiment of a system configuration according to the present invention.

FIG. 1 shows the basic configuration of an upset welding system according to an embodiment of the present invention. Elements 1 are cut plates. Element 3 is a hydraulic cylinder to provide an upsetting force to the cut plates 1 for butting against each other. Element 4 is a hydraulic cylinder used to clamp the cut plates 1. Element 5 is a nozzle of a carbon dioxide laser beam. This nozzle may also provide a jet of argon or helium gas during processing. Element 6 is a guide for moving the laser beam along the upset interface, that is, a laser beam transfer tube. Element 2 is a power transformer to supply an electric current to the plates 1. This transformer is operated during the application of pressure by cylinder 3 as well as before, during and after the irradiation by the laser beam.

While the cut plates 1 are conductive during the upset welding, they are heated and softened by the resistance heat produced in the plates 1. The upset pressure causes plastic deformations in the abutting surfaces of the plates 1 pressing the heated abutting surfaces against each other so as to provide a good fit at the abutting surfaces and also forms a small amount of excess metal at the weld line. Thus, the gapless upset ends of the plates 1 have been obtained, and the small amount of excess metal serves as a substitute for welding materials for the high-power-density beam. Therefore, the thickness of the plates 1 to be fused by irradiation by the high-power-density beam is the original thickness of each plate 1 plus the height of the excess metal formed by the preliminary upset welding. The height of the excess metal depends upon the upset welding current and pressure. Therefore, the output of the high-power-density beam must depend upon the pressure and the heat input provided by the Joule heating during the preliminary upset welding. The irradiation by the high-power-density beam fuses the incomplete abutting surfaces formed by the preliminary upset welding, and welds the surfaces of the plates 1 to each other completely.

Figure 2:
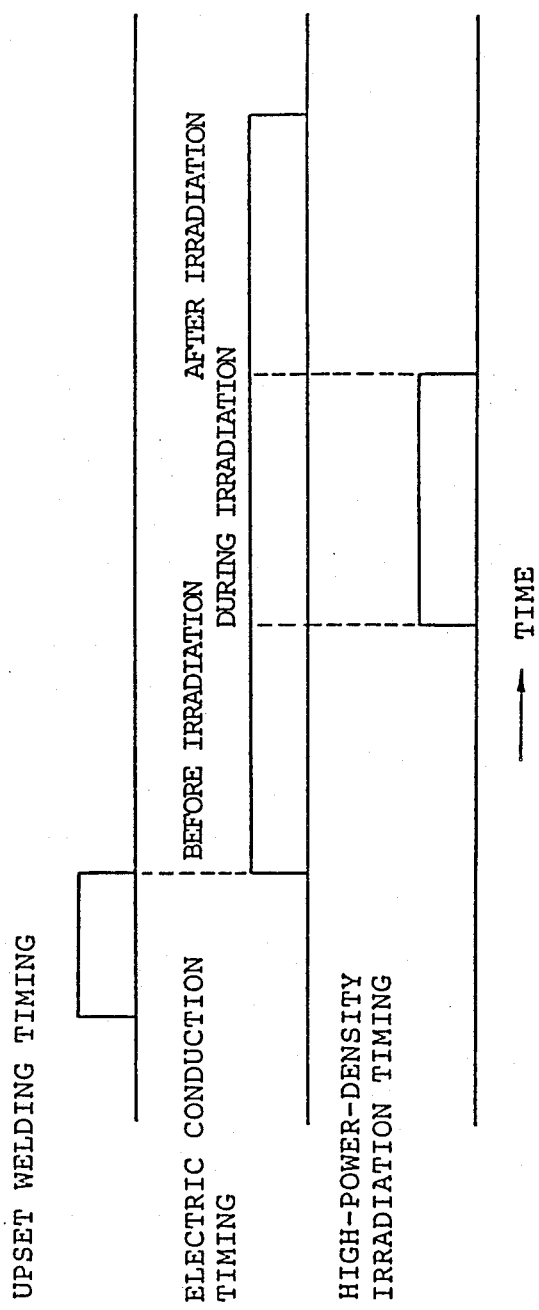
FIG. 2 is a time chart showing the electric conduction timing to mitigate the quick heating or cooling of welding objects.

An electric current supplied to the plates 1 in one or more processes before, during and after the irradiation by the high-power-density beam after the upset welding, produces heat in and near the abutting surfaces of the metallic materials to mitigate any quick heating or quick cooling of the plates 1 to be welded by the high-power-density beam, and consequently to prevent any excessive hardening of the weld. FIG. 2 shows an example of the electric current supply timing.

If the high-power-density beam is a laser beam, it is possible to blow argon gas or any other process gas onto the metallic materials in order to facilitate the fusion thereof. If argon gas is used, a wide area by fusion is provided by the irradiation of the laser beam. If helium gas is used, the area of fusion is narrower than in case of argon gas. Whether argon or helium gas is used as process gas, or whether the mixture of these gases or any other gas is used will to be determined considering the metallurgical characteristics of the welding objects, the form of the excess metal and the thickness of the plates 1.

This embodiment according to the present invention is a welding system comprising an upset welding machine and a carbon dioxide laser processing machine. However, it is also possible to install an upset welding machine and a laser processing machine separately so as to set and subject the preliminarily upset-welded materials to the fusion welding in the laser processing machine. After the preliminary upset welding, it is also possible to subject the materials to fusion welding with an electron beam.

A detailed embodiment according to the present invention will be described below wherein JIS G3131 SPHC materials (30 mm wide and 3.1 mm thick) were subjected to AC upset welding and laser welding. In this embodiment, an upset welding machine and carbon dioxide laser processing machine were used.

The preliminary upset welding was performed under the conditions as shown in Table 1, while the laser irradiation conditions were as shown in Table 2. Table 1 shows that the mechanical force and electric power required for the preliminary upset welding are smaller than for ordinary upset welding, where a welding current of 170 Amp/mm$^2$ and an upsetting force of about 10 kg/mm$^2$ are required to provide an excellent weld.

Table 3 shows the weld performance provided by the present invention in comparison with those by conventional welding methods, where the symbols X, Δ and O represent poor, acceptable and good, respectively. Table 4 shows the welding efficiencies of these welding methods. These tables show that the welding method according to the present invention is superior to the conventional methods in many aspects.

TABLE 1

| Preliminary-upset welding conditions | | | |
|---|---|---|---|
| AC peak average current | Pressure | Resistance welding time | Upset length |
| 140 Amp/mm$^2$ | 5 kg/mm$^2$ | 20 | 1 mm |

Note:
The resistance welding time is represented in AC cycles (50 Hz)

TABLE 2

| Laser beam irradiation conditions | | |
|---|---|---|
| Laser output | Welding speed | Flow rate of process gas |
| 4.0 kwatt | 3.0 m/min | He 15 liters/min |

TABLE 3

| Method | Tensile strength | Bending strength | Appearance | Bead end not fused | Undercut | Excess metal |
|---|---|---|---|---|---|---|
| Upset (1) welding | Δ | Δ | X | present | none | big |
| Laser (2) welding |  | X | Δ | none | present | small |
| Welding (3) according to this invention |  |  |  | none | none | small |

TABLE 4

| Method | Yield | Pre- & post-process time |
|---|---|---|
| Upset welding (1) | bad | long |
| Laser welding (2) | good | long |
| Welding according to this invention (3) | good | short |

Figure 3:
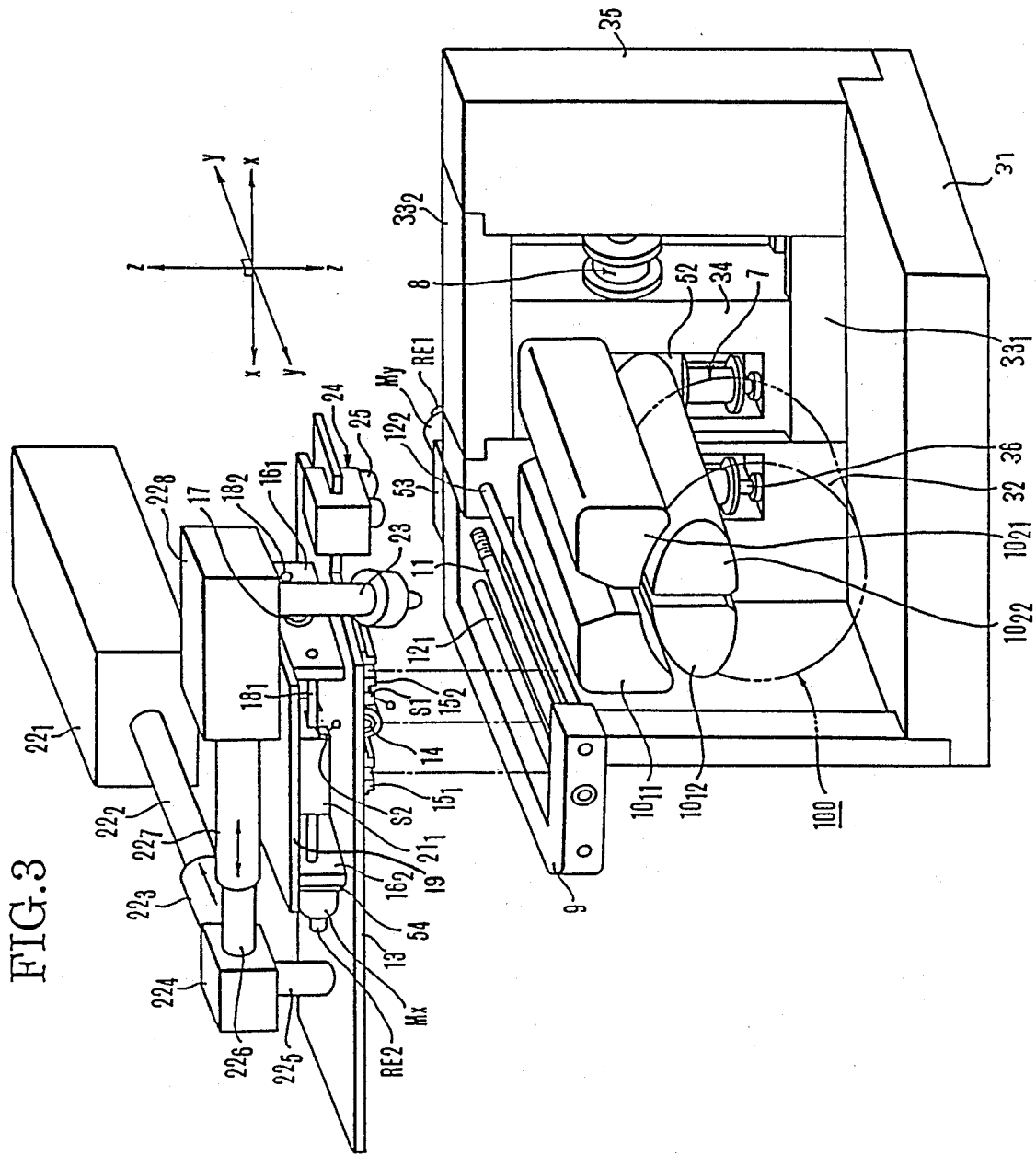
FIG. 3. shows an apparatus according to the present invention.

FIG. 3 shows an embodiment of an apparatus according to the present invention. For easier understanding the mechanism for driving a laser torch 23 along with laser torch support 13 are shown lifted from a machine frame 9.

A support 32 and a support 35 are fixed on a base of an upset welding unit. Between the supports 32 and 35, guide beams $33_1$ and $33_2$ are vertically spaced and fixed to the supports 32 and 35. An electrode support block 34 is mounted on the guide beams $33_1$ and $33_2$ in such a way that it is freely movable in the x direction.

An end of a first electrode material $10_{11}$, extending in the y direction, is fixed on the fixed support 32 through an insulating material. An electrode support block (not shown) is mounted on the fixed support 32 in such a way that it can be moved vertically (in the z direction). A second electrode material $10_{12}$, extending in the y direction, is fixed on this electrode support block through an insulating material. A hydraulic cylinder 36 is inserted between this electrode support block and the fixed support 32. The upper chamber and lower chamber of the hydraulic cylinder 36, which are partitioned by a piston, are connected to a high-pressure line and a low-pressure line, respectively, so that when the piston is moved down to project the piston rod out of the cylinder, the second electrode material $10_{12}$ can be moved up and strike against the first electrode material $10_{11}$. If a wheel material 100 to be upset welded is then placed between the electrodes, it is pressed by and between the electrode materials $10_{11}$ and $10_{12}$.

A third electrode material $10_{21}$ extending in the y direction, is fixed on the electrode support block 34 through an insulating material. On the electrode support block 34, another electrode support block 52 is mounted in such a way that it can be moved vertically (in the z direction). A fourth electrode material $10_{22}$ is fixed on the electrode support block 52 through an insulating material. A hydraulic cylinder 7 is inserted between the electrode support block 52 and the electrode support block 34. The cylinder 7 is fixed on the block 52, while a piston rod of the cylinder is fixed to the block 34. The upper and lower chambers of the hydraulic cylinder 7, which are partitioned by a piston, are connected to a high-pressure line, and a low-pressure line respectively, so that when the piston is moved down to project the piston rod out of the cylinder, the fourth electrode material $10_{22}$ can be moved up and strike against the third electrode material $10_{21}$. If the wheel material 100 to be upset welded is then placed between the electrodes, it is pressed by and between the electrode materials $10_{21}$ and $10_{22}$.

A hydraulic cylinder 8 is inserted between the electrode support block 34 and the support 35. The cylinder 8 is fixed fixed to the block 34, while a piston rod is on the support 35. The left and right chambers of the hydraulic cylinder 8, which are partitioned by piston, are connected to a high-pressure line and a low-pressure line, respectively, so that when the piston is moved right to project the piston rod out of the cylinder 8, the electrode support block 34 can be moved left to move the third and fourth electrode materials $10_{21}$ and $10_{22}$ to the left. If the end part of the wheel material 100 is pressed by and between the first and second electrode materials $10_{11}$ and $10_{12}$, while the other end part of the wheel material 100 is pressed by and between the third and fourth electrode materials $10_{21}$ and $10_{22}$, as described above, the end part of the wheel material 100 is butted against the other end part thereof with an upsetting force exerted on the end faces (abutting) surfaces) of the two end parts. Pressed by the upsetting force, the abutting surfaces are resistance-welded to each other by applying an upset weld voltage to the first and third electrode materials $10_{11}$ and $10_{21}$. At the same time, the end faces are softened to form angular protrusions on the two end parts around the abutting surfaces. In other words, the cross section including the weld line is in the form of the letter M.

On the fixed support 32 is a machine frame 9 in the form of the letter C and extending primarily in the y direction, by which a threaded rod $11_2$ extending in the y direction, is rotatably supported and on which a guide bar $12_1$ is fixed in parallel with the threaded rod. Between the fixed support 32 and the machine frame 9, another guide bar $12_2$ is fixedly attached in parallel with the threaded rod 11. The end of the threaded rod $12_1$ is connected to the output shaft of a reduction gears assembly 53 through the machine frame 9. The input shaft of the reduction gear assembly 53 is connected to the rotary shaft of an electric motor My and a rotary encoder RE1. The rotary encoder RE1 generates an electric pulse per each predetermined angular rotation of the input shaft of the reduction gear assembly 53.

As shown separately in FIG. 3, the threaded rod 11 is passed through and engaged with the threaded hole of a nut 14 fixedly on mounted on the laser torch support 13. Mounted on the laser torch support 13 are guide seats $15_1$ and $15_2$, having concave sections connected to and supported by the guide bars $12_1$ and $12_2$. Therefore, when the motor My is normally rotated, the threaded rod 11 is normally rotated to move the laser torch support 13 forward (in the direction out of the sheet on which FIG. 3 is shown). When the motor My is reversed, the threaded rod 11 is also reversed to move the laser torch support 13 backward (in the direction into the sheet on which FIG. 3 is shown). The laser torch support 13 is equipped with a limit switch S1. When the laser torch support 13 is moving backward and is near the limit switch S1, the toggle of the limit switch S1 strikes the machine frame 9 to set the limit switch S1 into an open state and consequently stops the energized motor My.

On the laser torch support 13, a threaded rod 17 and guide bars $18_1$ and $18_2$, similar to the threaded rod 11 and the guide bars $12_1$ and $12_2$ respectively, extend between supports 16, and $16_2$ in the x direction.

The threaded rod 17 is screwed in a nut (not shown) fixed on another laser torch support 19. Mounted fixedly on the laser torch support 19, guide seats $21_1$ and $21_2$ ($21_2$ not shown) having a concave section are connected to and supported by the guide bars $18_1$ and $18_2$. The output shaft of reduction gears assembly 54 is connected to the end of the threaded rod 17, while the input shaft of the reduction gears assembly 54 is connected to a motor Mx and a rotary encoder RE2. Therefore, when the motor Mx is rotated, the threaded rod 17 is also rotated to move the laser torch support 19 forward (or left) relative to the laser torch support 13. When the motor Mx is reversed, the rotation of threaded rod 17 is also reversed to move the laser torch support 19 backward (or right) relative to the laser torch support 13. The laser torch support 19 is also equipped with a limit switch S2. When the laser torch support 19 is moving backward and near the limit switch S2, the toggle of the limit switch S2 strikes against the support 16, on which the threaded rod 17 is mounted. As a result, the limit switch S2 is set into open state to stop the energized motor Mx.

On the laser torch support 19 is mounted a mirror box $22_8$ coupled with the laser torch 23. A beam duct $22_6$ is inserted in a beam duct $22_7$ fixed on the mirror box $22_8$, the beam duct $22_6$ being fixed on a mirror box $22_4$, which is fixed on the laser torch support 13 through a support $22_5$. Another beam duct $22_3$ is fixed on the mirror box $22_4$ with a beam duct $22_2$ for a laser emitting device $22_1$ inserted in the beam duct $22_3$. The beam duct $22_7$ can be moved forward and backward in the x direction relative to the beam duct $22_6$. The beam duct $22_3$ can be moved forward and backward in the y direction relative to the beam duct $22_2$. The laser emitting device $22_1$ is fixed on an on-floor support (not shown) separate from the above-described movable parts.

On the laser torch support 13 are mounted a TV camera 24 and a lighting lamp 25. Therefore, in this embodiment, the laser torch support 13 is only moved in the y direction relative to the machine frame 9 so that the TV camera 24 and the lighting lamp 25 are also moved only in the y direction, while the laser torch support 19 is moved only in the x direction relative to the support 13 so that the laser torch 23 is moved in both the y and x directions. The TV camera 24 and the lighting lamp 25 are placed just a little to the right side of the electrode materials $10_{11}$ and $10_{12}$ in the x direction, that is, the position where the weld line is formed in the upset welding process, and they are moved by the motor My in the y direction. At the same time, the laser torch 23 is also moved in the y direction, and can be moved in the x direction when the motor Mx is driven. The laser torch 23 is driven in the x direction according to the x-direction deviation of the weld line so that it can always focus its beam on the center of the weld line width during its movement in the y direction.

It is understood that the apparatus according to present invention can be used not only for the upset welding of wheel materials, but also for that of the end faces of plate, belt, band and other materials.

The present invention has the following advantages:

1. The preliminary upset welding can provide the upset beveling between welding objects necessary for laser welding, while conventional laser welding requires a beveling machining step before the laser welding process. Thus, the welding method according to the present invention eliminates the beveling machining step, yet can still laser beam welding.

2. Such defects that are liable to be produced by the upset welding method at the abutting surfaces can be harmlessly fused and agitated by the laser beam irradiation.

3. The excess metals formed at the weld can be smaller than those formed by upset welding, so that post processing and material losses are reduced with the yield increased and the marginal cost of production decreased. In addition, the electric power and mechanical force requirements are not as high as in conventional upset welding.

4. The small excess metals formed by the preliminary upset welding serve as substitutes for filler metal and can prevent the production of bead form defects detrimental to laser welding.

5. Such undesirable changes in metallurgical characteristics that are liable to be caused by the excessively quick heating or cooling during laser welding can be mitigated by the heating by electric conduction, which can control the cooling rate.

What is claimed is:

1. A method of welding, comprising the steps of:
   (i) placing two substantially planar surfaces of a workpiece or workpieces in spaced facing relation, said planar surfaces defining edges of said workpiece or workpieces;
   (ii) heating said workpiece or workpieces near said edges to a welding temperature and pressing said surfaces together to thereby form a substantially continuous upset weld line; and
   (iii) irradiating said upset weld line formed in step (ii) with a high power density beam to thereby form a substantially continuous final weld line.

2. A method as claimed in claim 1, wherein said irradiating comprises irradiating with a laser beam within the range of far infrared.

3. A method as claimed in claim 2, wherein an appropriate gas to facilitate fusion is blown onto said upset weld line prior to said irradiating.

4. A method as claimed in claim 1, wherein said irradiating comprises irradiating with an electron beam.

5. A method as claimed in claim 1, further comprising heating during and/or after said irradiating step.

6. A method as claimed in claim 5, wherein said heating includes supplying an electric current to said workpiece or workpieces near said edges.

7. A method as claimed in claim 5, wherein said irradiating comprises irradiating with an electron beam.

8. A method as claimed in claim 5, wherein said irradiating comprises irradiating with a laser beam within the range of far infrared.

9. A method as claimed in claim 8, wherein an appropriate gas to facilitate fusion is blown onto said upset weld line prior to said irradiating.

10. A method as claimed in claim 1, wherein the output of said high power density beam is dependent upon the amount of heat and pressure applied in said heating and pressing step.

11. A welding apparatus, comprising:
    a frame;
    first clamp means mounted on said frame, second clamp means movably mounted on said frame, said first and second clamp means adapted to support respective objects near edges thereof intended to be welded together such that the edges are substantially parallel and substantially within a plane;
    means associated with said clamp means for heating at least one of the objects in an associated one of said clamp means to a welding temperature; and
    laser means mounted on a laser support means in a position for directing a welding beam from said laser means substantially normal to said plane, said laser support means being movably mounted on said frame for movement of said laser means in two directions, said directions being substantially perpendicular to each other and substantially within said plane.

12. An apparatus as claimed in claim 11, wherein said first clamp means comprises a first electrode fixed to said frame, a second electrode mounted on said frame for movement toward and away from said first electrode, and means for moving said second electrode;

said second clamp means comprises a third electrode fixed to a support block, said support block mounted on said frame for movement toward and away from said first and second electrodes, a fourth electrode mounted on said support block for movement toward and away from said third electrode, means for moving said fourth electrode, and means for moving said support block; and said means for heating includes power supply means electrically connected to said first and said second electrodes and/or said third and said fourth electrodes for passing an electric current through the object clamped between associated ones of said electrodes.

13. An apparatus as claimed in claim 11, wherein said laser support means includes a first support mounted on said frame for movement in a first one of said two directions, and a second support mounted on said first support for movement in a second one of said two directions.

14. An apparatus as claimed in claim 13, wherein said first direction is substantially parallel to the edges of the objects, and an upset weld line position detector is mounted on said first support.

* * * * *